May 7, 1946. G. M. DYE 2399,992
EXPOSURE METER FOR PRINT MAKING APPARATUS
Original Filed Aug. 4, 1942 7 Sheets-Sheet 1

INVENTOR
GLEN M. DYE
By Chas. C. Reyf.
Attorney

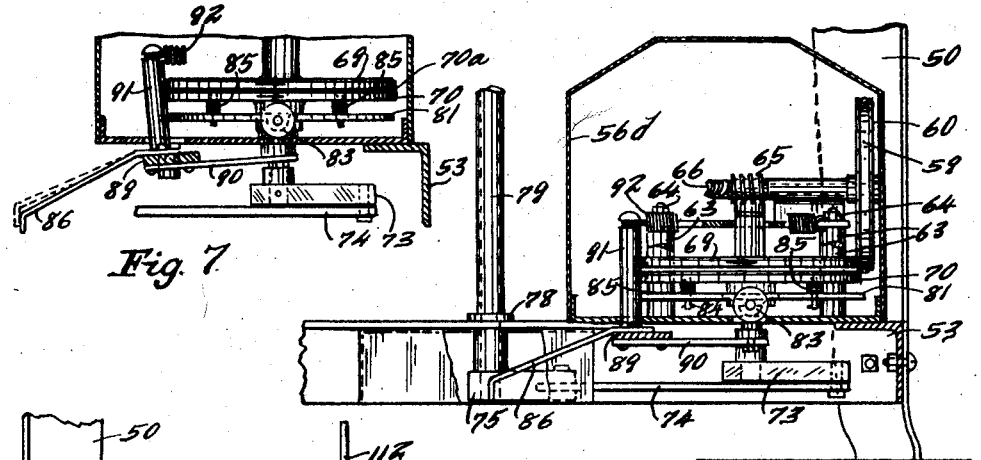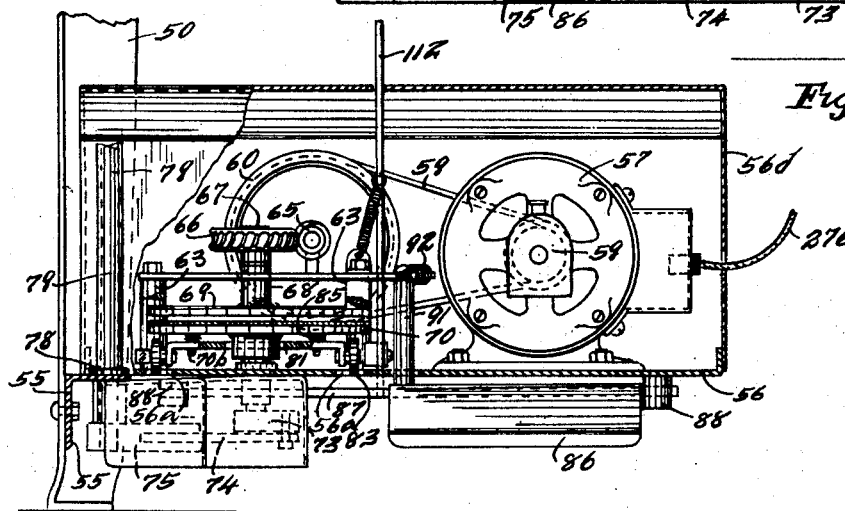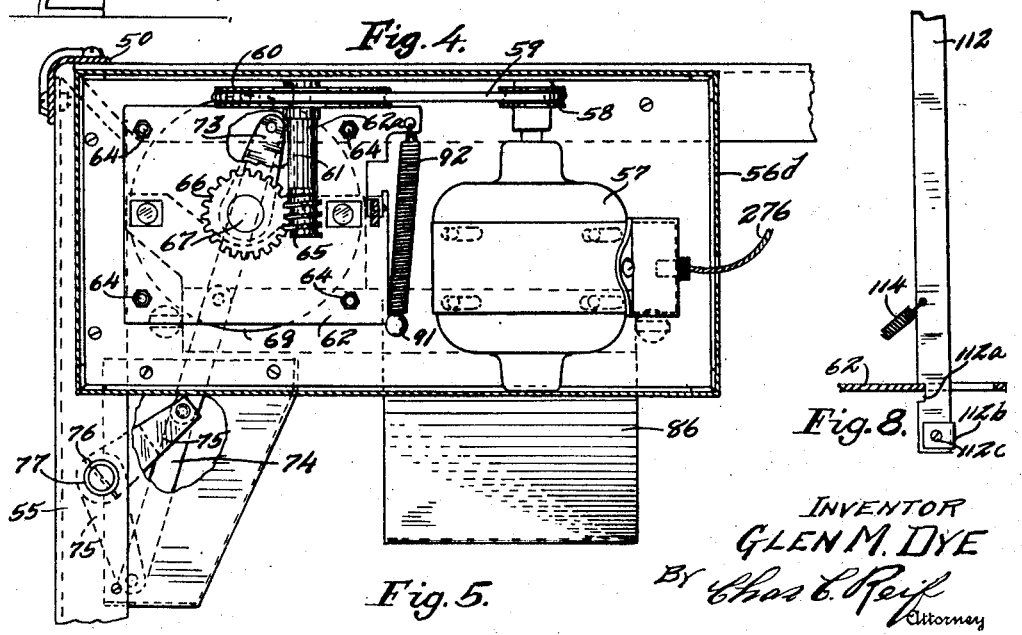

May 7, 1946. G. M. DYE 2,399,992
EXPOSURE METER FOR PRINT MAKING APPARATUS
Original Filed Aug. 4, 1942 7 Sheets-Sheet 5

Inventor
GLEN M. DYE
By Chas. C. Rey.
Attorney

May 7, 1946.　　　　　G. M. DYE　　　　　2,399,992
EXPOSURE METER FOR PRINT MAKING APPARATUS
Original Filed Aug. 4, 1942　　　7 Sheets-Sheet 7

Inventor
GLEN M. DYE
By Chas. C. Reif
Attorney

Patented May 7, 1946

2,399,992

UNITED STATES PATENT OFFICE 2,399,992

EXPOSURE METER FOR PRINT-MAKING APPARATUS

Glen M. Dye, Minneapolis, Minn.

Original application November 7, 1938, Serial No. 239,269, now Patent No. 2,291,613, dated August 4, 1942. Divided and this application July 10, 1942, Serial No. 450,397

8 Claims. (Cl. 88—24)

This invention relates to a projection printer for making photographic prints or to a machine for making oversized prints. The machine is designed to make projection prints from negatives of different sizes, which prints will have a size range comprising a very large proportion of such projection prints or enlargements now commercially made.

This is a division of copending application No. 239,269, filed November 7, 1938, now patent No. 2,291,613, of August 4, 1942.

It is an object of this invention to provide a motor driven projection printer which is constructed and arranged for rapid, convenient and efficient operation.

Another important object of the invention is the provision of a novel exposure guide device for use in accurately controlling a suitable printing exposure.

It is still another object of the invention to provide a projection printer equipped with an exposure meter having a graduated density scale and a member in plain view of the operator moved along said scale during the printing period so that the position of said member will show the length of the exposure or printing period.

It is a further object of the invention to provide a projection printer equipped with an exposure meter comprising a series of density indications, a member movable along the same, means for starting the movement of said member at the same time the printing operation is started, and means under the control of the operator for terminating the printing period.

These and other objects and advantages of the invention will be fully set forth in the following description made in connection with the accompanying drawings in which like reference characters refer to similar parts throughout the several views and in which:

Fig. 4 is a view partly in side elevation and partly in vertical section of the driving mechanism, a section being taken through the lower part of the clutch and the enclosing casing;

Fig. 5 is a horizontal section taken through the top of the casing enclosing the driving parts and showing the driving parts in plan;

Fig. 6 is a vertical section taken through the casing enclosing the driving parts showing the driving parts in side elevation, some parts being shown in section;

Fig. 7 is a vertical section through the casing enclosing the clutch showing the clutch and friction mechanism in side elevation;

Fig. 8 is a fragmentary view showing the tripping mechanism for the printing lamp switch;

Fig. 9 is a vertical section taken centrally through the lamp box;

Fig. 10 is a vertical section taken centrally through the lamp box in a plane at right angles to that to which Fig. 9 is taken;

Figure 1:
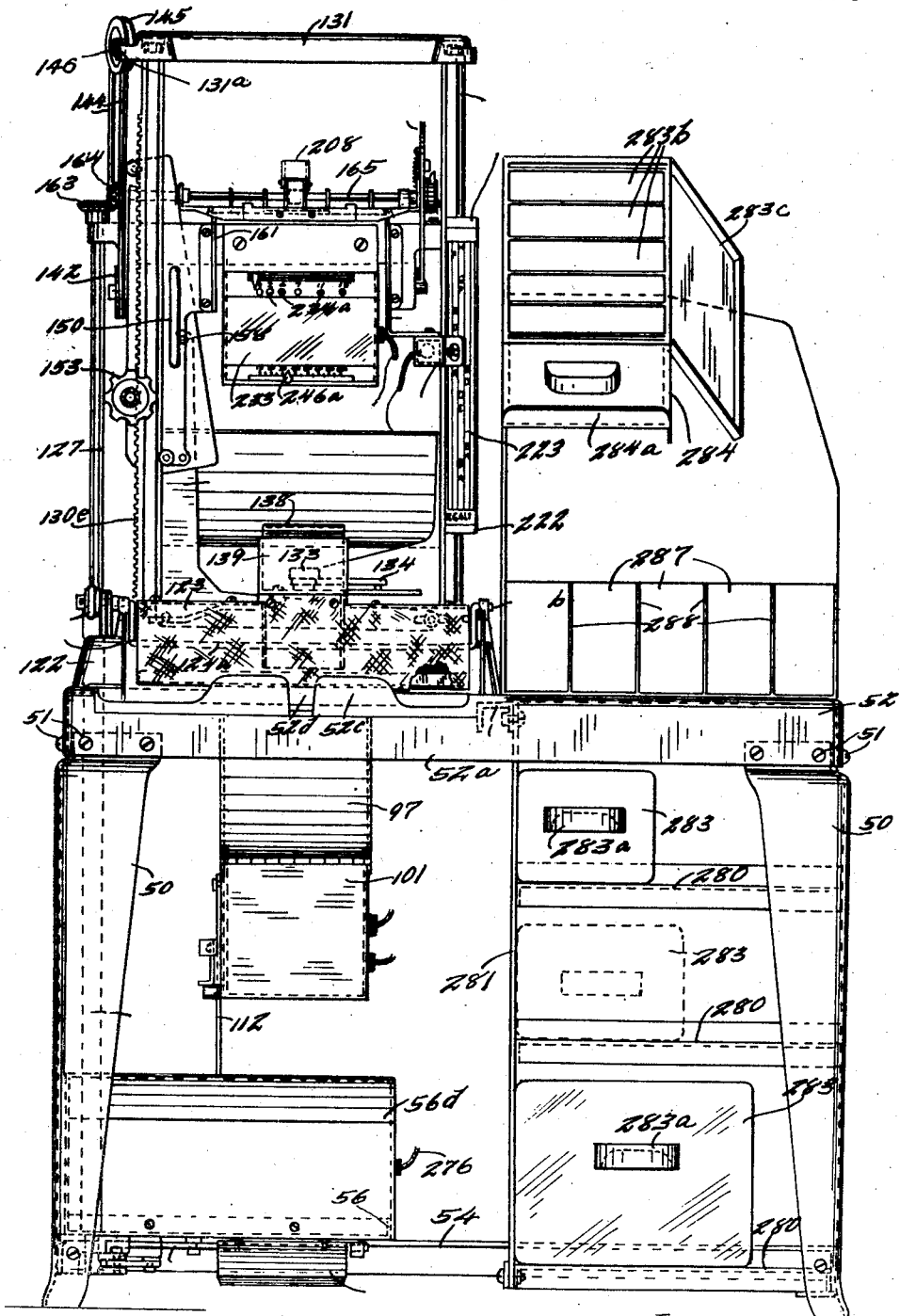
Fig. 1 is a view in front elevation of the machine.

Referring to the drawings a machine is shown comprising a frame including legs 50 shown as four in number. These may be of any suitable construction and are illustrated as of angle shape in cross section tapering toward their lower ends with the inside of their angles disposed inwardly and secured at their upper ends by screws 51 to a substantially horizontal plate or table 52 having a depending flange 52a extending thereabout with the inner side of which legs 50 engage. A bar 53 of angular cross section extends between legs 50 at one side adjacent their bottoms and another bar or plate 54 extends between the pair of legs at the opposite side adjacent the bottom thereof. A bar 55 shown as angular in cross section is also secured to and extends between the rear legs 50 adjacent their bottoms. A plate 56 having upturned flanges at its edges is secured to bars 53 and 55 and an electric motor 57 is supported by and secured to plate 56. A pulley 58 is secured to the armature shaft of motor 57 and has a belt 59 running thereover which also runs over a pulley 60 secured to a shaft 61 journaled in a bearing 62a carried on a plate 62. Plate 62 forms part of a clutch frame and is supported upon posts 63 shown as four in number and is secured thereto by headed screws 64. Posts 63 seat on plate 56 and are secured thereto by the screws 64. Shaft 61 has a worm gear 65 secured thereto which meshes with a worm wheel gear 66 secured to a shaft 67 journaled in a bearing 68 carried by plate 62. A clutch plate 69 is secured to the end of shaft 67 and when the machine is in operation is continuously driven from motor 57. Plate 69 cooperates with another clutch plate 70 adapted to be brought into engagement therewith at certain times and to be driven thereby. Plate 70 will have some suitable friction material 70a thereon and is secured to a shaft 71 journaled in a bearing 72 carried by plate 56. An arm 73 is pivotally connected to a link 74, the other end of which is secured to an arm 75 having a hub secured in any suitable manner as by pin 76 to a shaft 77. Shaft 77 is journaled in a bearing 78 secured in plate 56 and has an enlarged portion above said plate extending into and secured in the lower end of a tubular shaft 79. Shaft 79 extends vertically adjacent one side of the machine and is secured to a pulley block which has a reduced portion, journaled in an opening in a casing top 122a to be later described. The clutch comprising plates 69 and 70 is a half revolution clutch and includes a third plate 81 having downturned ears at opposite sides and to which are secured studs having journaled thereon rollers 83. Plate 81 has apertures at either side through which extend studs 70b secured to and depending from plate 70, said studs having pins 84 extending therethrough below plate 81. Compression coiled springs 85 surround studs 70b engaging plate 70 at their upper ends and plate 81 at their lower ends. The plate 56 has spaced openings 56a therein spaced the same distance as the rollers 83 and into which rollers 83 are adapted to drop to determine the half revolution period of the clutch. Said clutch is adapted to be actuated by a toe trigger or pedal 86 oscillatable about the axis of a rod or shaft 87 journaled in small blocks 88 secured to the underside of plate 56. A bar 89 is secured to shaft 87 by which the trigger plate 86 is carried and an arm 90 is secured to and extends rearwardly from bar 89 and carries clutch actuating parts adapted to raise plate 81. The trigger plate also has upstanding therefrom a stud 91. A tensile coiled spring 92 is secured at one end to a projection on plate 60 and is secured at its other end to the upper end of stud 91 and said spring acts to hold trigger plate 86 in its raised or inoperative position. When trigger plate 96 is pressed downwardly by the toe of the operator to its lower position the clutch makes one-half a revolution and arm 73 also makes a half revolution or rotates through 180 degrees. A box-like cover 56d fits over the flange on plate 56 and forms an enclosure for the motor and clutch parts. The specific construction of the clutch need not be further described as it per se forms no part of the present invention. A casing 50a secured to plate 56 encloses arm 75.

A lamp box is provided, the top of which is formed by a plate or casting 52b which is secured in and in effect forms part of table top 52. Said plate 52b has a flange 52c at its forward end having therein a slot or opening 52d which is continued as a slot through the bottom of plate 52b for some distance. Said plate 52b has a raised portion 52e therein and a trough 52f is formed at the front portion of the plate 52b between flange 52c and portion 52e. Portion 52e is apertured and has a depending cylindrical flange 52g extending downwardly therefrom. An annular flange 52h is formed in portion 52e and forms the support for a lens 93. Said lens may be positioned on a resilient annular strip 94 shown as circular in cross section. Said lens 93 is held in position by a plate 95 which may be made of any suitable material and in practice has been made of Masonite. Plate 95 is secured to portion 52e by countersunk screws 95b. A small bracket 96 is secured to the underside of plate 52b at its forward portion by small screws 96a and has a lip extending downwardly and inwardly substantially at a 45 degree angle. A front plate 97 is provided for the lamp box, the same having a latch 97a pivoted thereto by a pivot member 97b, said member 98 being adapted to be moved over the inner side of bracket 96 to hold plate 97 in closed position. Plate 98 has small brackets 97c secured thereto, the same being offset to form lips directed toward each other and to extend over a mirror 98 which is thus secured to the inner side of plate 97. Plate 97 is hinged by a hinge 100 to the vertical stationary front side plate 101a of the lamp box casing 101. Side plate 101a has secured thereto adjacent its bottom a resilient cushion block 100a against which plate 97 will engage should it be dropped. Casing 101 has a bottom plate 101b having an aperture 101c therethrough, one function of which is to admit cool air into the lamp box. The lamp box also comprises side plates 101d which engage the outer side of flanges 52i formed on plate 52b and to which they are secured. Brackets 102 illustrated as formed from angle members are secured to side plates 101d and extend across the lamp box adjacent the bottom thereof. Headed screws 103 extend through the lower part of bracket 102, being held therein by nuts 104, said bolts also extending through a plate 105 and being equipped with wing or thumb nuts 103a beneath plate 105, said nuts thus holding said plate in position. Plate 105 is centrally apertured and forms a seat for a ball member 106a formed on a rod 106 which extends through the bottom of the lamp box through opening 106c and carries at its upper end the lamp socket 106c in which the printing lamp 107 is secured. Rod 106 has a handle 106b at its lower end. A stationary contact member 108a forming one part of the printing lamp switch 108 is carried on a small angle bracket 109 secured to one side plate 101b. The movable contact 108b of switch 108 is carried on a pin 110 of insulating material being disposed at the inner and outer sides of side plate 101b and moving with and forming in effect guide members for pin 110. Pin 110 extends through a vertically movable bar 112, said pin having a head formed thereon at the outer side of said bar and having a small cotter pin 113 extending therethrough at the inner side of inner plate 111. Bar 112 extends downwardly through a slot 62a in plate 62 and has formed therein a notch 112a adapted to engage with plate 62 at one side of slot 62a as shown in Fig. 8. Bar 112 has adjustably secured thereon a block 112b held in place by a screw 112c and said block is adapted to be engaged by a projection 83a on one of the rollers 83 in the revolution of plate 81. This disengages notch 112a from plate 63 and bar 112 is moved downwardly by a tensile coiled spring 114 secured to bar 112 at one end and at its other end to plate 63. A pilot lamp 107a is also provided in the bottom of lamp box casing 101. A second and condensing lens 93a is provided disposed at right angles to lens 93 and carried in an angle bracket 101e and secured therein by headed and nutted bolts 101d'. Spring washers 101f are disposed under the nuts on bolts 101d' and clamping members 93b which may be of resilient material are disposed under the heads of the nuts on bolts 101d and engage lens 93a. It will be seen from Fig. 9 that lenses 93 and 93a are flat on one side and have convex surfaces at their other side, said convex surfaces being directed toward mirror 98. A flat casing 101h is disposed below plate 52b above lamp 107, the same containing insulating material 101i. Said parts are provided to prevent the heat from lamp 107 unduly heating plate 52b thereabove. An opening 101j leads from the upper part of the lamp box and communicates with a vertical flue 101k which extends upwardly to the top of the machine. While said flue may be of any form, in the embodiment of the invention illustrated it is shown as rectangular in cross section.

Figures 9, 10:
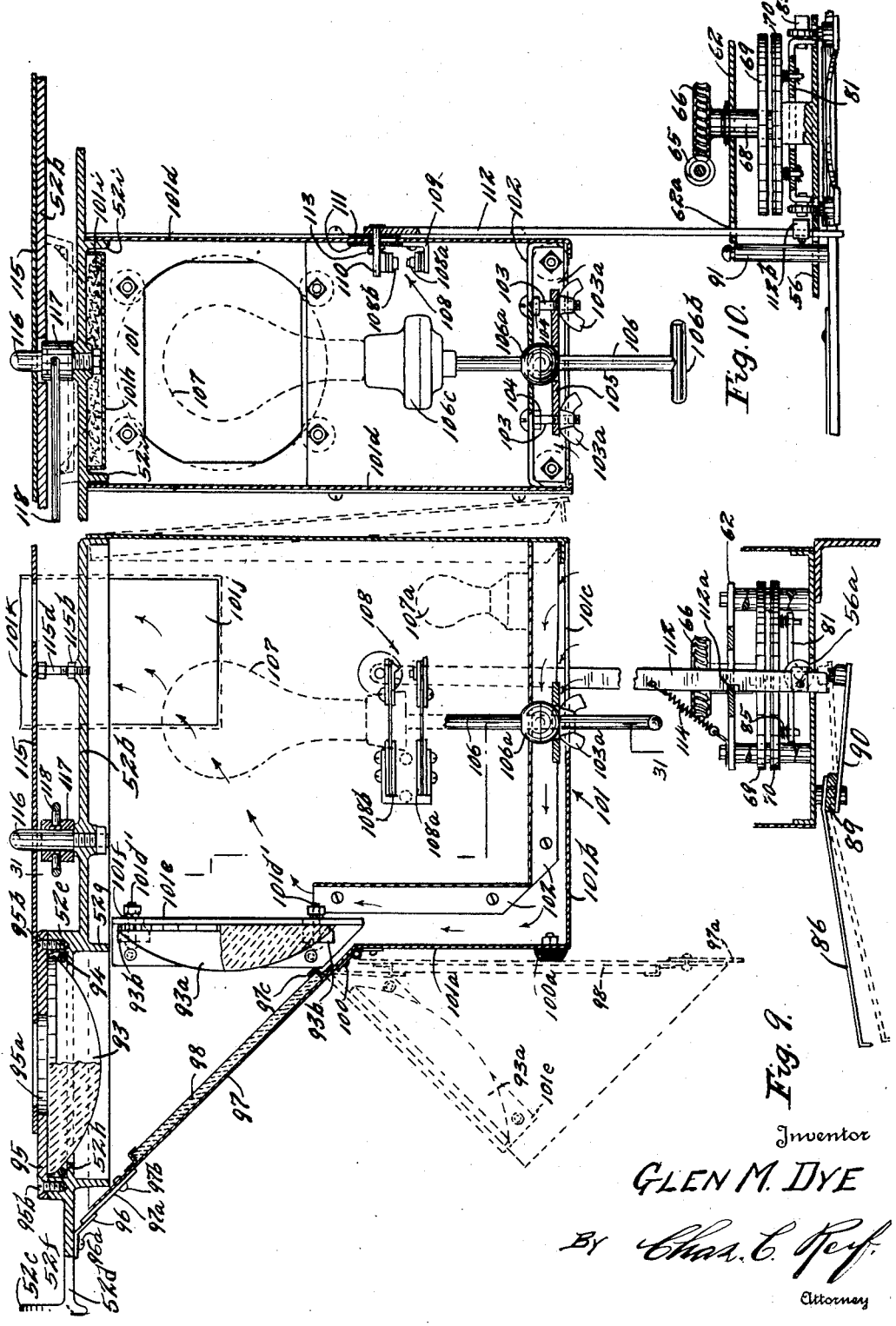

The member 95a has an opening therein through which the light for printing passes and the top surface of member 95 forms the supporting surface for the negatives such as films which are to be printed. A negative holding means is provided comprising a rotatable plate or turret 115. Plate 115 is rotatably mounted on a pin 116 secured in member 52b and is arranged to be raised by a sleeve 117 disposed therebeneath and slidable on pin 116. A rest for plate 115 is provided comprising a headed screw 115d adjustably threaded into member 52b and adapted to be held in adjusted position by a lock nut 115d. Sleeve 117 is adapted to be lifted by a lever 118 having end portions disposed at opposite sides thereof, said lever having parallel spaced portions joined at their ends remote from sleeve 117. Lever 118 is arranged to tilt about a fulcrum member 119 carried on member 52b. An operating means for plate 115 is provided and comprises a knee-operated lever 120 having a horizontal portion 120a journaled in bearings 121 secured to the underside of table 52, said portion being bent at its end substantially at a right angle, and disposed to overlie the closed or outer end of lever 118. Lever 120 also has an outer downwardly extending portion 120b formed with spaced parallel sides, which portion is contacted by the knee of the operator. While lever 120 may be of any suitable form, in the embodiment of the invention illustrated it is shown as made from a round rod. It will be seen that by pressing laterally on portion 120b plate 115 will be lifted and it can then be easily rotated about pin 116. Plate 115 has quite a number of circumferentially spaced openings 115a therethrough adjacent its circumference, which openings are of different sizes and shapes. Openings 115a are thus adapted for use with negatives of different sizes and are adapted to determine different areas to be printed. Flat spring members 115c are secured at either side of one of the openings 115a and press on plate 115 at the sides of said opening, said springs being adapted to hold certain small films or to engage a special holding means for a very small film such as a strip film from a motion picture camera. Plate 115 is adapted to be held or locked in position with one of the openings 115a over the light opening 95a and for this purpose said plate is provided with a plurality of holes 115d, there being one for each opening 115a. When the respective opening 115a is in proper position relative to the light opening the corresponding hole 115d receives a pin 115e which upstands from member 52b. When the plate 115 is lifted for rotation it is lifted clear of pin 115e. A casing 122 having a substantially horizontal top 122a spaced a short distance above table 52 extends over holder 115, the same having outwardly and downwardly sloping sides. Said casing 122 is open at its front for the insertion and removal of the negatives and also has its top 122c offset upwardly at said front. The open front portion of casing 122 is closed during the printing operation by a flexible opaque curtain 123. Curtain 123 is weighted at its lower edge in any suitable manner as by having a metal rod secured thereto at said edge. In the embodiment of the invention illustrated curtain 123 is shown as formed of a folded piece of material and a bar 123a is disposed in the bight or lower folded portion of the curtain, and forms the weight for the edge thereof. Said curtain and weighted edge overlap at their ends the downwardly and outwardly sloping front portions 122b of casing 122 which are disposed at each side of the opening in its front as shown in Fig. 9. Curtain 123 is moved to open and closed position by a crank rod 124 having the portion 124a extending across the underside of said curtain, said rod having portions 124b journaled in bearings in casing 122 at each side of said curtain. Portions 124a and 124b are parallel and spaced about half the vertical width of curtain 123. One portion 124b at the left of Fig. 6 is extended and has secured thereto a pulley 125. A belt 125a runs over pulley 125 and turns through a right angle to run in a groove in pulley block 126. Block 126 is secured to the tubular shaft 79. A shaft 127 of polygonal shape in cross section illustrated as of hexagonal shape is connected to and driven by block 126. The belt 125a is secured to pulley block 126. Crank rod 124 is oscillated through substantially 180 degrees at the beginning and end of each printing operation and portion 124a folds and lifts curtain 123 to open position and then lowers it to closed position. The pulley block 126 oscillates at the beginning and end of each printing operation and moves through slightly more of a revolution than is necessary to operate crank rod 124 and raise and lower curtain 123. Belt 125a slips on pulley 125. The curtain and crank 124 may be operated manually at any time if it is desired to look into the opening in casing 122. This can be done without throwing the operation of crank 124 and curtain 123 out of step or synchronism with the machine. The belt 125a will merely slip on pulley 125 and said pulley and crank rod 124 will again be operated at the proper time in the operation of the machine by belt 125a from block 126.

Two rear rods 130 and forward rods 130a and 130b are secured at their lower ends in top 122a and extend vertically to a three sided yoke 131 having forwardly extending parallel sides spaced at their front ends. While yoke 131 could be variously made, in the embodiment of the invention illustrated it is shown as in the form of a channel with its open side directed downwardly. Certain vertical rods or posts form guides on which are slidable two assemblies, one of which carries a projecting lens unit 133 having an adjusting means 134 and the other and upper of which carries the paper supporting and handling mechanism. Lens unit 133 is supported in a carriage on which is also carried a plate 138 having a forwardly curved upper end which extends over a plate 139 fixed to the top plate 122a. The other of said two assemblies constitutes a paper carriage and comprises a member 140 having rollers 140c slidable on rods 130a and 130b. Member 140 at one side has secured thereto a pulley 142 rotatable on a suitable headed stud. A cord or cable 144 is secured at one end to a lug 131a projecting from yoke 131 and extends downwardly around pulley 142 and then upwardly and over a pulley 145 rotatable on a stud 146 secured in yoke 131. From pulley 145 cable 144 extends downwardly and is connected to a suitable counterweight movable vertically to balance member 140 and parts carried thereby. Member 140 has projecting forwardly therefrom a bail handle 150. Rod 130a has a rack 130e formed on or secured to its outer side with which meshes a small pinion carried on a shaft journaled in member 140 which has secured thereto at the front of member 140 a small hand wheel 153. It will thus be seen that member 140 and parts supported thereon may be raised and lowered by handle 150 and that accurate adjustment may be had by turning hand wheel 153. The movement of the paper carriage is quite free and easy due to said counterweight.

The lens carriage and paper carriage are thus interconnected and arranged for determined relation and movement so that the image projected by the lens will always be sharply focused on the paper by lens unit 133. The connections between said casings includes a bell crank lever 155. The paper carriage 140 has secured thereon by plate brackets 161 a plate glass member 162. A platen carrier 172 is provided and is swingable about a shaft 165. Shaft 154 is driven from shaft 127 through bevelled gears 163 and 164. A mask carrier is disposed beneath the platen carried by carrier 172 and said mask carrier and platen are adapted to swing upwardly and rearwardly at the end of the printing period to discharge the print. Mechanism including a counterweight 194, a cam 182 and cam roller 187 are provided for operating the said platen and carrier which need not be specifically described. The print is discharge and is guided into any suitable receptable. A numbering device 208 is provided and is swung to place a number on the print at each printing operation. An exposure giude or meter is provided and this comprises a casing 230 secured to the central part of paper carriage 140. A mirror 233 is supported on this casing. A small casing in the rear of said mirror contains a lamp. The front of casing 230 at its upper portion is provided with a plurality of holes or openings 234a and these will have extending thereover a diaphragm or sheet of material so that light will show through holes 234a in different degrees of density. These openings may be designated by certain characters as shown in Fig. 1. A pointer is adapted to move along holes 234a. A scale is shown below mirror 233 with which cooperates a movable pointer 246a.

An index member 233 comprising a cylinder carried in end members 222 is used along which moves a small casing 225 containing a lamp 226 and supported by a bracket 224. Index member 223 is supported upon collars 222 revolubly mounted on a rod 221 secured in yoke 131. A print grinding panel 218 is provided at the rear of the machine.

The structure described in the last three paragraphs form no part of the invention claimed in this application and need not be more specifically described.

Figure 2:
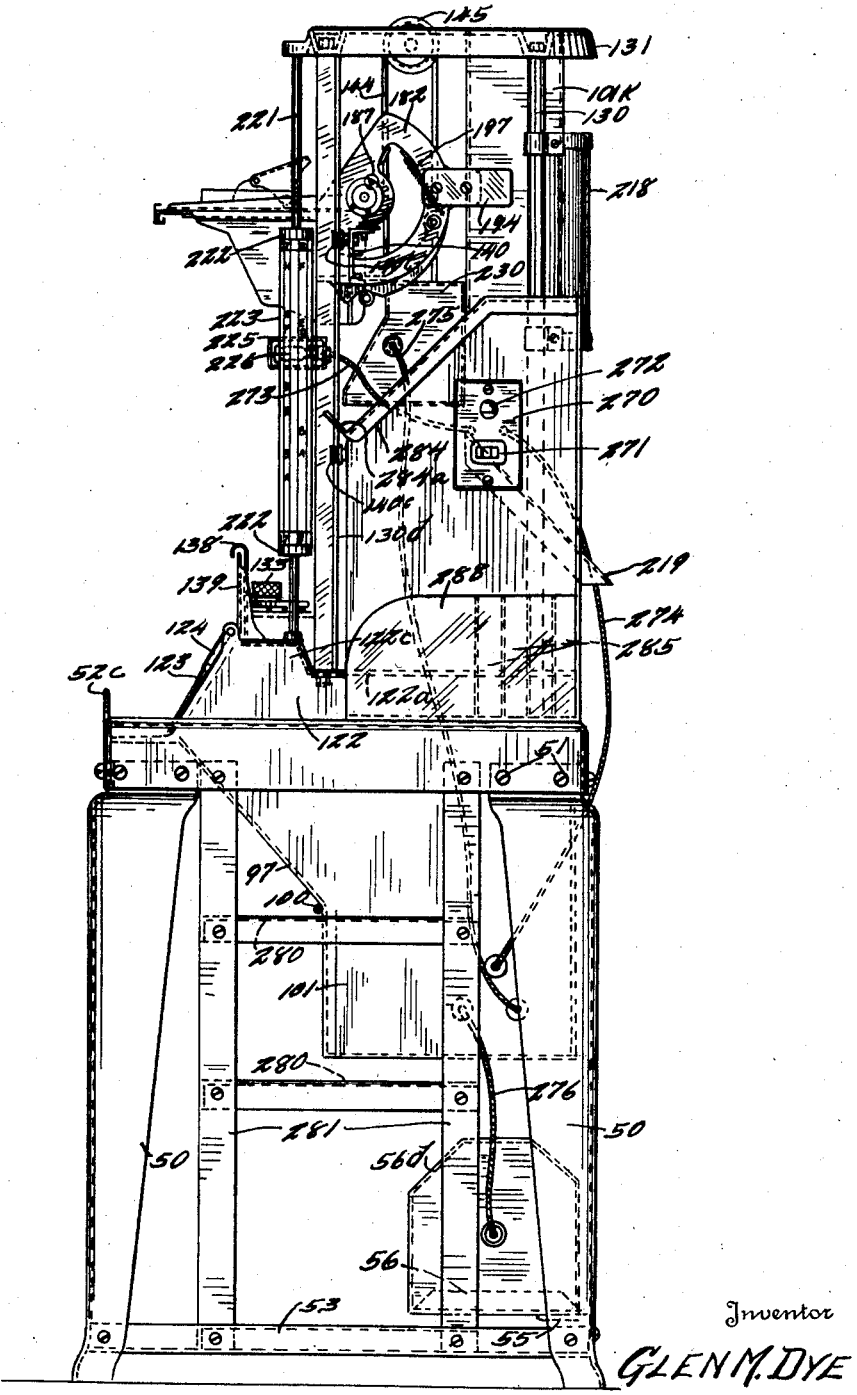
Fig. 2 is a view in side elevation as seen from the right of Fig. 1.
Figure 3:
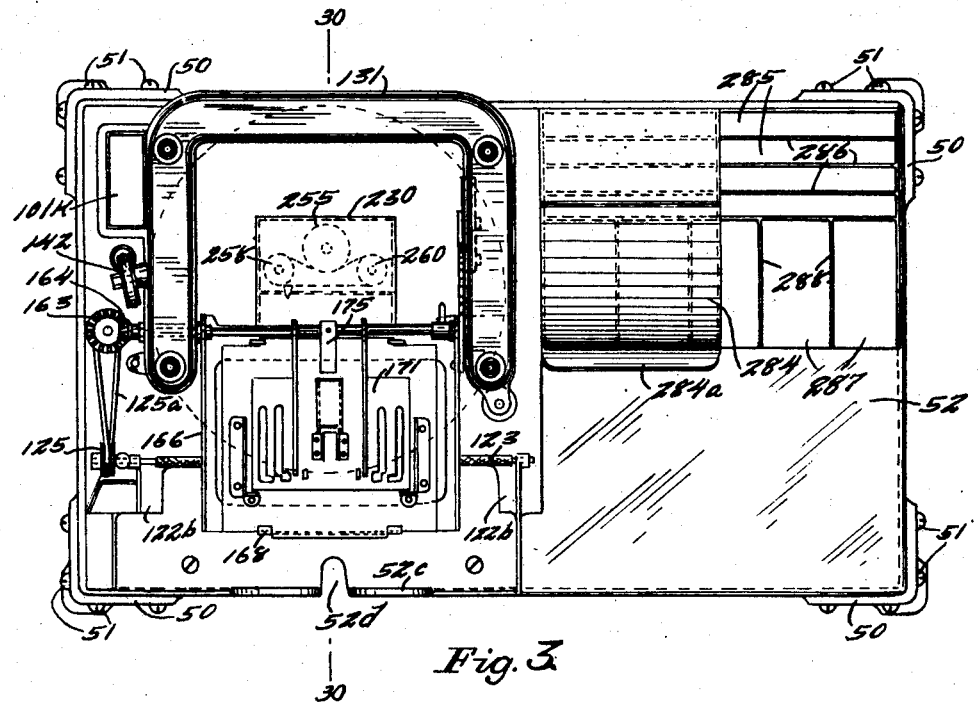
Fig. 3 is a plan view of the machine.
Figure 11:
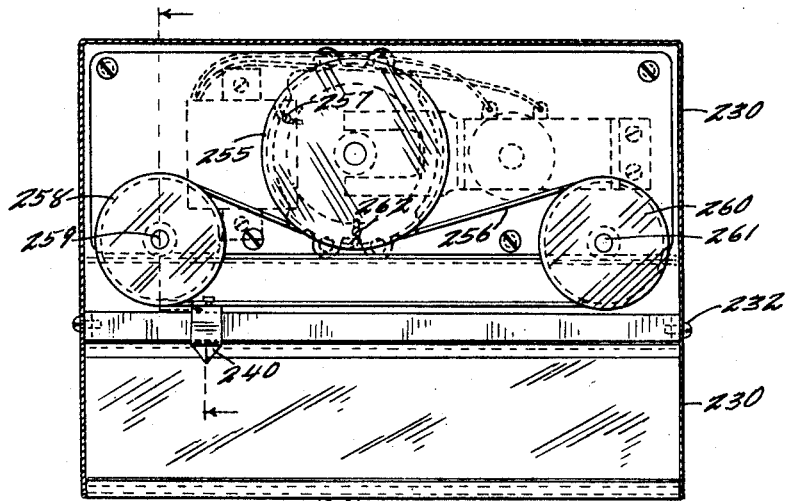
Fig. 11 is a plan view showing an exposure guide device, the enclosing casing being shown in horizontal section.
Figure 12:
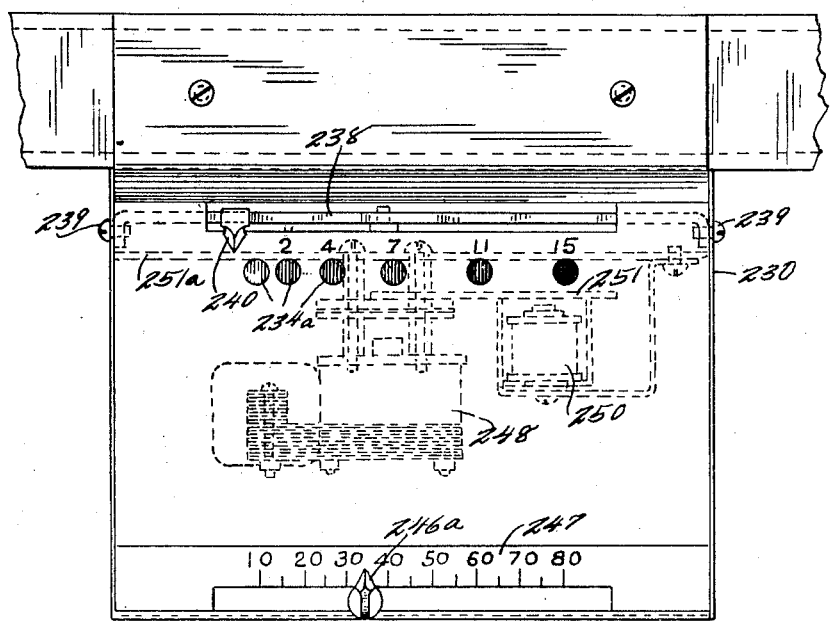
Fig. 12 is a view in front elevation of the exposure guide device.
Figures 13, 14:
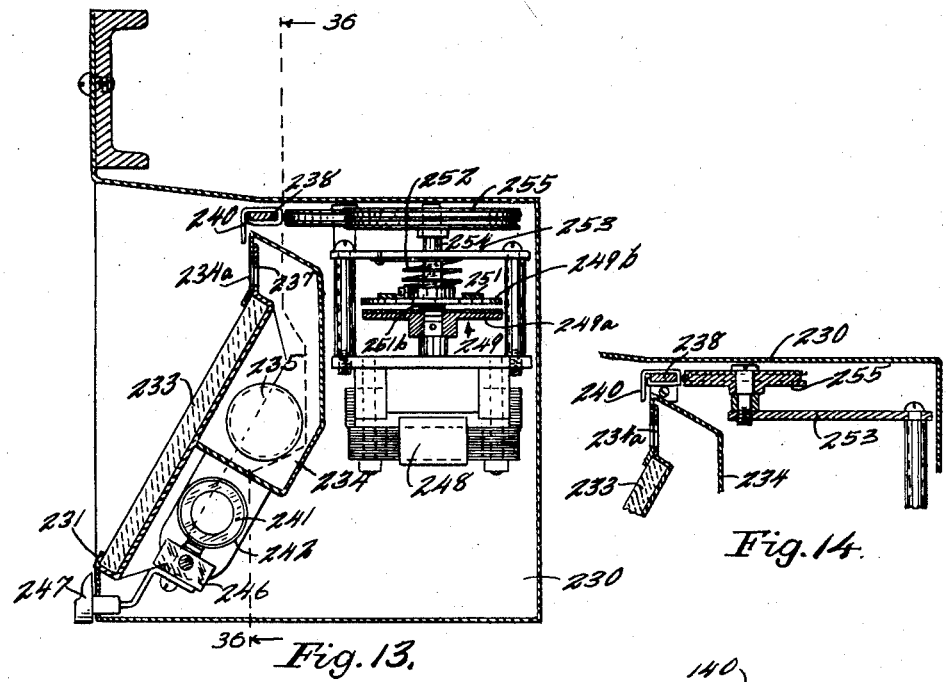
Fig. 13 is a vertical section through the exposure guide device.
Fig. 14 is a vertical section through a portion of the exposure guide device.
Figure 15:
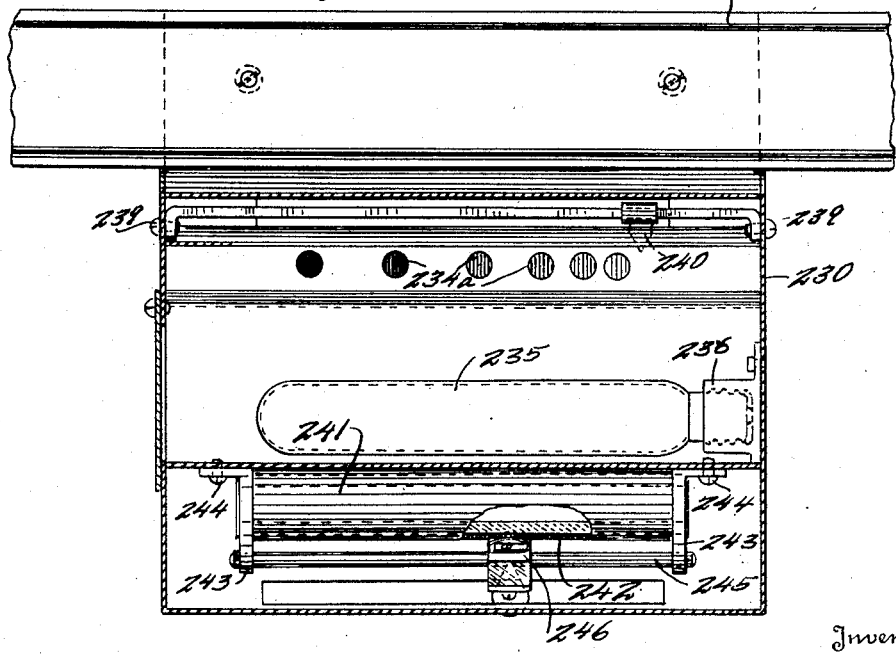
Fig. 15 is a vertical section taken on line 36—36 of Fig. 13 as indicated by the arrows.

As stated, an exposure guide or meter is provided (see Figs. 11 to 15). A casing 230 of general rectangular form in vertical cross section is provided, the same being secured to the central part of paper carriage 140. A plate bracket 231 extends across casing 230 adjacent the bottom and forward portion thereof, being secured by screws 232 and forms a support for a mirror 233. Said bracket also supports a small casing 234 in the rear of said mirror which contains a lamp 235 shown as of elongated cylindrical form, the same being carried in a socket 236 secured to one end of casing 230. The front of casing 234 at its upper portion is provided with a plurality of holes or openings 234a and these will have extending thereover a diaphragm or sheet of material 237 of such nature so that light will show through holes 234a in different degrees of density. As shown in Fig. 12 the opening at the right is quite dark and the openings are progressively lighter toward the left. These openings may be designated by certain characters as shown by the numerals in Fig. 12. A bar 238 extends across the top of casing 230 being secured by screws 239, which bar has slidable thereon a pointer member 240. Below casing 234 is a cylinder 241 having a resistance conductor 242 wound thereon. Said cylinder 241 is held in apertures in spaced brackets 243 secured to casing 234 by screws 244. Brackets 243 also carry at their lower ends a bar or rod 245 on which is slidable a contact member 246 adapted to cooperate with the resistance member 242. Member 246 also carries a pointer 246a which cooperates with a scale 247 visible at the front of casing 230. A clock motor 248 of the conventional back geared type is mounted in casing 230, the same driving a clutch disk 249a of the clutch 249. An electromagnet 250 is provided, said magnet and motor being carried by a bar 251a extending across and secured in casing 239. The electromagnet 250 operates a clutch fork lever 251 which is arranged to engage and move a clutch disk 249b of the clutch 249 to bring the same into engagement with disk 249a. Disk 249a is shown as having its flat surface covered with some suitable friction material 249a. A small compression spring 251b is disposed between the disks 249a and 249b and a coiled torsion spring 252 is secured to the back of disk 249b and to a bar 253 forming part of the motor and magnet frame, which frame also carries the clutch. Disk 249b is carried by a shaft 254 to which is secured a pulley 255. A belt 256 illustrated as of cylindrical cross section is secured at one end by a small screw 257 to pulley 255, the same extending partially around said pulley and then around a pulley 258 carried on a shaft 259 suitably supported in casing 230 and around a similar pulley 260 carried on a shaft 261 supported in casing 230, said belt then again passing to pulley 255 and having its other end secured to said pulley by a small screw 262. The winding of the electromagnet 250 will be in circuit with the printing lamp 107. Belt 256 is connected to the member 240. From the described structure it will be seen that when electromagnet 250 is actuated lever 251 will engage the disks of clutch 249 so that pulley 255 will be driven. Belt 256 will be driven and the same will travel around pulleys 258 and 260 so that the pointer member 240 will travel across bar 238 above the openings 234a. When electromagnet 250 is deenergized the clutch disks 249a and 249b are separated and springs 252 will rotate disk 249b and pulley 255 so that the belt 256 will be moved and the pointer 240 will be moved back to its position at the left as seen in Fig. 11. A switch box or casing 270 is carried on one side of the machine as shown in Fig. 2 and a main switch 271 has an operating handle projecting through an aperture in said casing. A small ruby lamp 272 is mounted on said switch casing above switch 271. A conductor 273 is shown extending from switch casing 270 to the small ruby lamp in casing 225. A conductor 274 extends from switch casing 270 to the lamp box casing 101. A conductor 275 extends from casing 230 and lamp socket 236 to the lamp box casing 101. Another conductor 276 extends from the lamp box casing to the motor casing 56d and motor 57. The power line for the machine can either enter the lamp box casing 101 or be brought into switch box 270.

The machine has a series of shelves 280 illustrated as three in number extending horizontally at one side thereof beneath table 52 and supported upon vertical bars 281 secured at their upper ends to table 52 and a channel member 282 extending across the same. Drawers 283 are adapted to be disposed on the shelves 280, the same having handles 283a on their front ends. A shelf 284 is formed at the right side of the machine, the same sloping downwardly and forwardly at an angle of substantially 45 degrees and having an upwardly and forwardly extending portion 284a at its lower end. The shelf 284 is adapted to support one of the drawers 283, which drawers as shown in Fig. 1, are provided with a plurality of compartments 283b and are also provided with a cover 283c. Beneath shelf 284 the machine is provided with a plurality of vertically extending compartments 285 divided by vertical partitions 286. Forwardly of the foremost partition 286 the machine is provided with a plurality of compartments 287 formed by partitions 288 having rounded forward corners.

In operating the machine, the main switch 271 is moved to closed position and this starts the motor 57, lights the index lamp 226 and lights the pilot light 107a. The function of the pilot light is to furnish sufficient light for the operator to place the negative over the light opening 95a. It will be understood that the machine will be operated in a dark room. The operator now takes the negative to be printed and selects the proper mask to give the desired enlargement or the desired size of print. It will be understood that at this time the platen is in its rearward position. The mask is quickly placed in position and the operator now presses laterally on the downturned portion 120b of lever 120, thus lifting negative holder 115. This holder is thus free for rotation and is quickly turned to bring the desired opening 115a in forward position. A negative is placed beneath the opening 115a and lever 120 is released. Plate 115 then descends holding the negative firmly on the top of plate 95. The inter-connection between the paper carriage 140 and the lens carriage 132 is so designed that the lens unit 133 is always brought to proper position so that the projected image will fill the mask opening. The paper is now placed in position. The operator now presses on the trigger plate 86. This, through arm 84, raises the plate 81, bringing the lower clutch plate 70 into engagement with upper clutch plate 69. The clutch is now engaged and rollers 83 have been raised out of the slots 56a and rotate about on the top of plate 56. When the lower plate 70 begins its movement arm 73 is rotated and this, through the link 74, rotates the arm 75. As above described, this rotates shafts 73 and 127 as well as shaft 165. The platen holder 172 is now swung down to paper holding position. At the same time the printing member is pressed against the paper on the non-emulsion side and the identifying character is printed on the paper. This character is usually the same for all of the prints on the particular order. This number of course, may vary as directed by the customer. As the platen reaches its position on the paper, plate 81 has revolved into position to bring projection 83a into engagement with block 112b on bar 112. This disengages notch 112a from plate 63 and said bar drops, thus closing switch 108. The closing of switch 108 lights the printing lamp 107, lights the lamp 235 in the exposure guide housing, actuates electro magnet 250 and starts the motor 248 so that pointer 240 starts to travel along the openings 234a. As shaft 127 rotated during the operating of the pulley, block 126 was rotated and this, through belt 125a, rotated pulley 125, thus moving crank rod 124 and lowering curtain 123 to its closed position. Curtain 123 thus closed the opening of casing 122 before the printing lamp was lighted. When the printing lamp is lighted the image as stated, is sharply focused on the printing paper. This image is reflected in mirror 233, which as shown in Fig. 1, is in view of the operator. The operator glances at said image and picks out a portion thereof which will determine the printing period. Every negative has certain contrasting parts therein and an experienced operator in looking at the negative can and does pick out some portion thereof which will determine the density of the print to be made or the time of exposure. Having selected the said portion of the image the operator then selects the opening 234a which most nearly corresponds to the density of the selected portion. If the selected portion is very dark then the opening at the right as shown in Fig. 12 and which is numbered 15 would be selected. If a lighter portion has been selected, perhaps spot or opening 7 would be selected. The openings 234a in effect form spots. The spots are designated by numerals in Figs. 12 and 15. This is not absolutely necessary but the numerals indicate the multiple of density of the particular spot in relation to the spot marked 1. In other words, the spot marked 2 is twice the density of the spot marked 1 and the spot marked 4 is twice the density of the spot marked 2. If desired, the spots could be arranged in a regular geometrical series of density. In practice, the pointer travels from the first spot to the last in about 20 seconds. The printing period will of course, vary with the kind of printing paper used. In the common practice in the art, printing papers of different speeds are used. To adjust the exposure guide for different print papers the pointer 246a is provided with the resistance 242. If a very fast paper is used, the pointer 246a will be adjusted to cut in resistance so that the lamp 235 will be dimmed and all of the density spots in openings 234a will be darkened. If a slow paper is to be used resistance will be cut out so that all of the density spots will be lightened in color. The indications on the scale 247 indicate different papers and pointer 246a will be placed in registry with the number designating the paper used at any particular time. As soon as the pointer 240 has reached the selected spot or opening the print will be finished and the operator then again steps on trigger plate 86. When the trigger plate is again pressed upon, the bar 112 will be raised and the printing lamp will be extinguished by the opening of the switch 108. It may be here pointed out that the trigger plate has two functions. One is to connect the clutch plates 69 and 70 and the other is to control the printing lamp after the printing operation. It is some times desired to doctor a print by giving one portion a little more exposure. An operator often does this by placing her hand or an instrument over a portion of a print or between the lens and the paper. This is a well known operation and can be done very quickly by an experienced operator. The operator may therefore, raise and lower trigger plate 86 several times quickly to light and extinguish lamp 107 before pressing the trigger plate down far enough to again operate the clutch. If no doctoring is to be done on the print the operator merely presses the trigger plate down all the way and this raises plate 81 and again operates the half revolution clutch comprising plates 69 and 70. When the clutch is engaged it makes a half revolution and arm 73 is again rotated, which through the mechanism described, operates shaft 127 and also as above described, shaft 165 is operated. This raises the mask carrier and platen together lifting the print and discharging it rearwardly. As above described, the mask carrier is returned to print receiving position and the platen remains in its rearward position. The print slides from the platen against panel 218 and then drops onto a deflecting plate and is guided into tray 220. The operation is quite rapid and the making of prints is only a matter of seconds. The lighting system illustrated is that using a projection lamp and condenser lenses which are the lenses 93 and 93a. As stated, these are planoconvex lenses. The lens 93a directs the rays in substantially straight lines against mirror 98 by which they are reflected upwardly into lens 93 which focuses the rays for direction into the lens unit 133. The projection lamp is extinguished a sufficient time before the print is raised for discharge that no difficulty is experienced with afterglow from the lamp. The operator can make a quick adjustment of the iris or diaphragm if this is necessary to suit the particular negative by merely swinging arm 134 to the desired position.

The lamp box is ingeniously made for easy access and cleaning. When the hinge side 97 is swung downwardly the lenses 93 and 93a may be cleaned or polished as can also the mirror 98 and access can be had into the casing 101 if desired. The rear side of the lamp box casing 101 is removable as indicated by the dotted lines in Fig. 9. This gives easy access to the inside of the casing and lamp bulbs 107 and 107a may be replaced when necessary. Easy access is thus also had to the switch 108. It is necessary to accurately position the printing lamp 107 relatively to lens 93a. The bulbs used may be of different sizes and the filaments vary in different bulbs. Rod 106 is slidable frictionally through ball 106a and this movement, together with the universal movement possible with ball 106a in the plate 105 gives all the necessary adjustment. The ball 106a is made in half sections which are clamped on rod 106 by bolts 103 and the nuts 103a. One section has a hole for rod 106 extending centrally therethrough while the other section has the hole for rod 106 extending to an acute angle to the flat side thereof. The adjacent flat surfaces are then at an angle to each other. When the sections are clamped together by nuts 103a the ball exerts a pinching effect on rod 106 thus holding the same and lamp 107 firmly in adjusted position.

The lamp box is ventilated to prevent excessive heating by cool air entering through the opening 101c and passing around the partition carried on brackets 102 as shown in Figs. 9 and 10. This partition forms a sort of a flue at the bottom and side of the box and the cool air then passes into opening 101j and into the flue 101k which extends to the top of the machine. There is enough height to the flue to get a good draft and the ventilating is quite effective.

The masks used can conveniently be kept in the compartments 285. The work order envelopes containing the films for each order can conveniently be placed in the compartments 287. The drawers 283 contain the print paper and paper of different speeds will be contained in the compartments 283b. The drawers can be conveniently positioned on the shelf 284 so that the paper is within easy reach of the operator. Another important feature of the machine is the trough formed in the rear of flange 52c. As the work is finished on each negative the operator can merely push the negatives forwardly so that they drop into said trough. When the particular order is finished the operator can reach into the trough with the thumb and finger through the opening 52d and grasp the pile of negatives between the thumb and finger so that they can be easily and quickly removed as a group. This adds to the rapidity of the operation.

The machine as described, is adapted to produce various standard sized paper prints from one size negative. This can be done by using the various masks provided and making the necessary adjustment on the index for the masks.

The machine can be used to produce various standard sized paper prints from different sized negatives. For instance, the prints can be made in such standard sizes as 4 by 6 inches, 5 by 7 inches and 6½ by 8½ inches by selecting the masks for those standard sizes and then using the different sizes of negatives in the proper holders or openings in the negative holder. If only one standard size of print is desired, the mask corresponding to that size would be used with the different sized negatives.

The machine can also be used to produce single sized prints from one negative with various magnifications. For instance, a certain mask, say a 4 by 6 mask, would be selected. The negative then could be enlarged to include all of the subject matter to cover the 4 by 6 print or onely a small part of the negative could be used to fill the 4 by 6 print. The hand wheel 153 may be turned somewhat to move the paper carriage upwardly a short distance and this increases the magnification of the central part of the negative. This procedure is frequently desired to eliminate some uninteresting subject matter about the edges of a negative.

The machine can also be used to produce single sized prints from different sized negatives. In this case only one size paper mask would be used and the different sized negatives would be placed under the different openings 115a. As each opening is brought over opening 95a, the paper and lens carriage would be adjusted to the proper letter.

The machine can also be used to produce prints with wide margins of different widths. This can be done by using a piece of paper larger than the image desired and using a mask which covers a large part of the paper about the edges thereof.

The negative holder holds each negative in the exact center of illumination. The negative holder being operated by the knee-operated lever leaves the hands of the operator free for other uses.

From the above description it will be seen that I have provided a very efficient and compact machine by means of which enlargements or oversized prints can be made with great ease and speed. The machine has been amply demonstrated in actual practice and found to be very successful and efficient. It is being put into commercial production.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An exposure guide device for a photographic printing machine having in combination, a support having an opening therethrough and adapted to support a negative, means for projecting light through said opening and negative supported thereon for printing from said negative, a mirror in which an image of said negative is reflected in position to be viewed by the operator, a density scale comprising areas of graduated density adjacent said mirror with which the reflection of said negative may be compared, a member movable along said scale, means for starting the movement of said member when said first mentioned means is actuated and means under the control of the operator for rendering inoperative said first mentioned means and stopping the movement of said member and the printing operation when said member reaches a selected point on said scale.

2. An exposure guide device for a photographic printing machine having in combination, a support having an opening therethrough, and adapted to support a negative, means for projecting light through said opening, and negative supported thereon, a mirror in which the image of said negative is reflected in position to be viewed by the operator, a density scale comprising areas of graduated density adjacent said mirror with which the reflection of said negative may be compared, a member movable along said scale, means for moving said member including a clutch, means for operating said clutch including a magnet, an electrical circuit including said first mentioned means and magnet, a switch for opening and closing said circuit whereby when said switch is moved to close said circuit said first mentioned means will be actuated and said magnet will be energized to operate said clutch and start movement of said member.

3. An exposure guide device for a photographic printing machine having in combination, means carrying an image of a negative and disposed in view of the operator, a density scale located near said means so as to be viewed simultaneously with said image and having spaced areas graduated in density whereby the operator can select a portion of said image corresponding to the density of one of said areas, means moving along said scale at uniform speed coincident with the printing period and means under the control of the operator for terminating the printing period when said means reaches said area on said scale.

4. The structure set forth in claim 3, means for illuminating said areas and means for adjusting the degree of illumination for varying the density of all of said areas.

5. An exposure guide device for a photographic printing machine having in combination, means in which an image of a negative to be printed is visible to the operator, a graded density scale disposed near said means so that the operator can view said negative and select a portion thereof and a point on said scale having substantially the same density, a member movable along said scale with a uniformly timed movement, means for starting the movement of said member from one end of said scale and simultaneously starting the printing period, and means actuated by the operator for terminating the printing period when said member reaches the selected point on said scale.

6. A device for determining the exposure period of a photographic negative having in combination, a transparent means for supporting a negative, means for projecting light through said negative for printing therefrom, means carrying an image of said negative in view of the operator, a density scale near said last mentioned means comprising spaced areas having respectively graduated densities so that the operator may select a portion of said negative from said image and select an area on said scale corresponding to the density of said portion, a member movable along said scale at uniform speed, means for simultaneously operating said second mentioned means to start the printing period and starting the movement of said member, and means for terminating the operation of said second mentioned means and thus terminating the printing period when said member reaches the selected area on said scale.

7. An exposure guide device for a photographic printing machine having in combination, means carrying a reflected image of a negative, a density scale near said means having areas with graduated densities said image and scale being disposed to be viewed simultaneously by the operator, a member movable at uniform speed along said scale and means for simultaneously starting the movement of said member along said scale and starting the printing period, and means under the control of the operator for terminating the printing period and stopping the movement of said member when the latter reaches a selecter area on said scale.

8. The structure set forth in claim 1, means for illuminating said areas of said density scale, means for varying the illumination of said areas, a second scale for indicating degrees of density, said last mentioned means including a pointer movable along said second scale for indicating the selected degree of illumination.

GLEN M. DYE.